Nov. 15, 1960

A. N. ADDIE ET AL 2,960,354

PRESSURE COMPENSATED FLEXIBLE PIPE

Filed Feb. 18, 1957

INVENTORS
Albert N. Addie &
BY Clarence H. Patrie

Paul Kilpatrick
ATTORNEY

Nov. 15, 1960  A. N. ADDIE ET AL  2,960,354
PRESSURE COMPENSATED FLEXIBLE PIPE
Filed Feb. 18, 1957  2 Sheets-Sheet 2
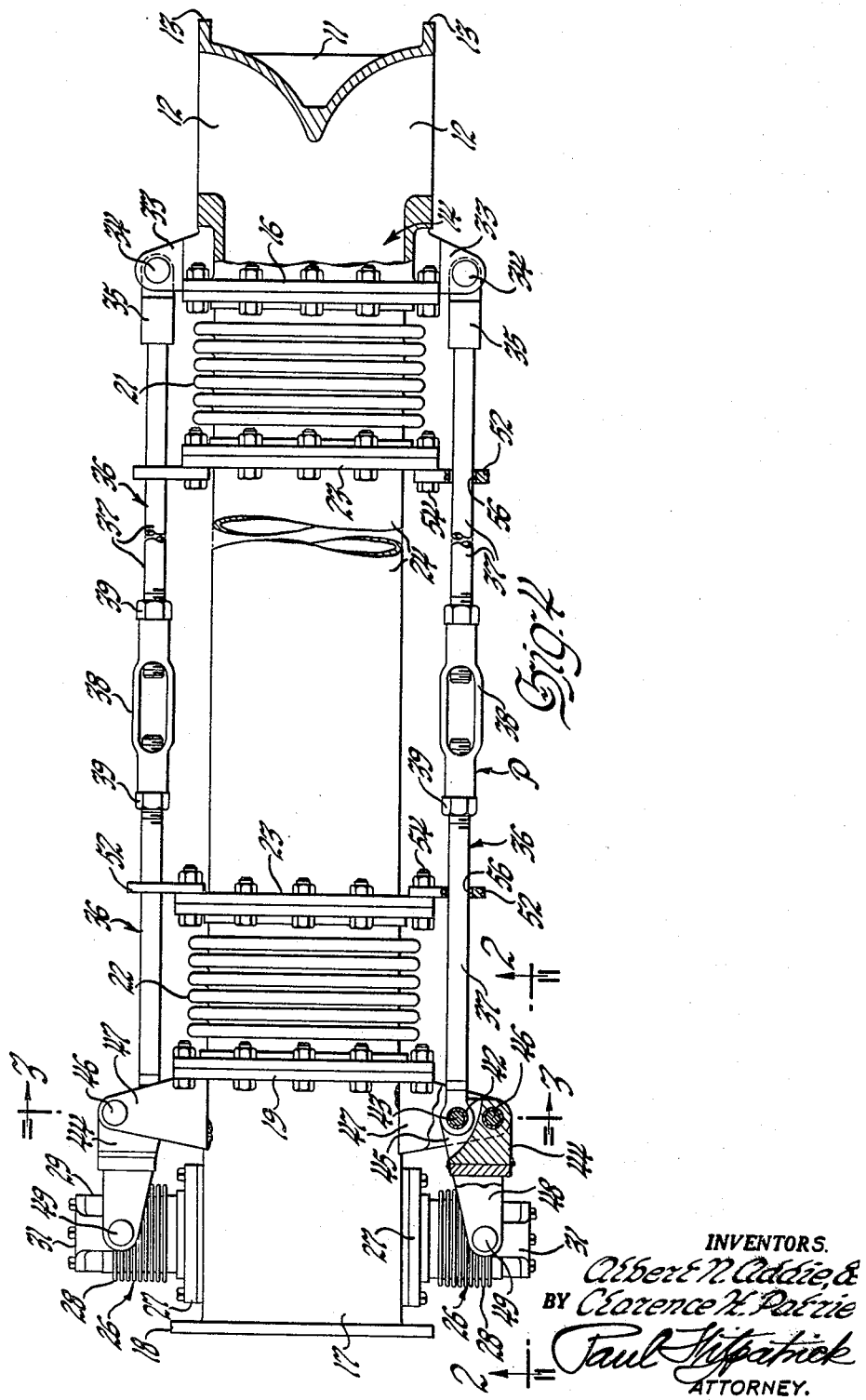
INVENTORS.
Albert N. Addie, &
BY Clarence H. Patrie
Paul Fitzpatrick
ATTORNEY.

United States Patent Office 2,960,354
Patented Nov. 15, 1960

2,960,354

PRESSURE COMPENSATED FLEXIBLE PIPE

Albert N. Addie, La Grange Park, and Clarence H. Patrie, La Grange, Ill., assignors to General Motors Corporation, Detroit, Mich., a corporation of Delaware Filed Feb. 18, 1957, Ser. No. 640,772

2 Claims. (Cl. 285—228)

Our invention relates to installations of piping which must be flexible or expansible to accommodate relative movement of the elements joined by the pipe or thermal expansion effects. The invention is illustrated herein as part of an installation in which gas generators are coupled to a turbine but, of course, it may be applied to other installations.

Where flexible or expansible joints are provided in large diameter pipes carrying fluid under considerable pressure, the separating force on the pipe in the axial direction due to the contained pressure needs to be counteracted to prevent this force from expanding the joint or connection axially. This must be done without preventing the effective operation of the expansible joints.

The present invention provides a flexible conduit of particularly desirable properties comprising, in general, rigid sections at the ends, an intermediate rigid section, and flexible expansible joints, preferably bellows, connecting the end sections to the intermediate section, with compact pressure responsive means acting to draw the end sections together with a force equal to the separating force exerted by the fluid in the conduit. The tension connections between the two end sections also serve to support and align the intermediate section. Because of the two flexible joints adjacent the ends, the pipe may readily conform to relative movement in any direction of the machines to which it is connected and to thermal expansion of these machines or of the rigid pipe sections.

The principal objects of the invention are to improve thermal power plant installations and to provide a superior flexible pipe for such installations.

The nature of the invention and the advantages thereof will be more clearly apparent from the succeeding detailed description of the preferred embodiment of the invention and the accompanying drawings in which:

Figure 4 is a plan view of the flexible pipe with certain parts cut away and in section.

Figure 1:
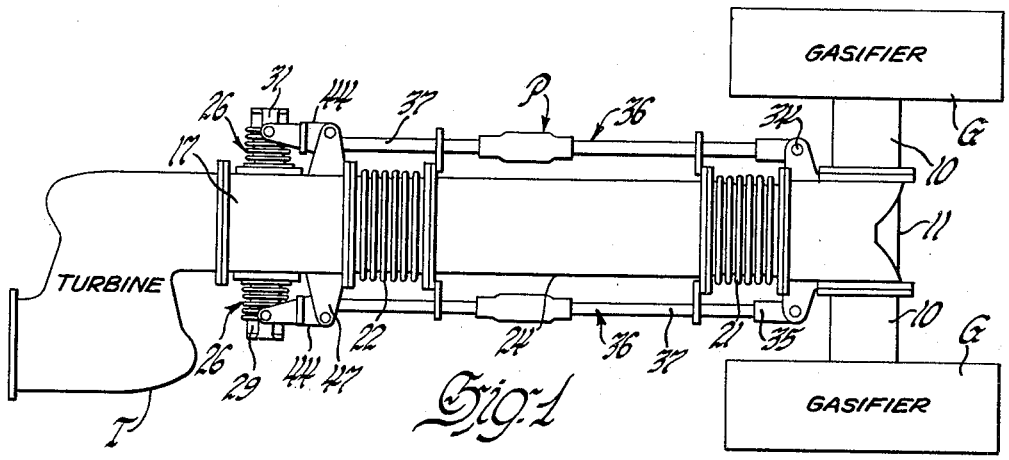
Figure 1 is a somewhat schematic plan view of a power plant including two gasifiers and a turbine connected by a flexible pipe according to the invention.
Figure 2:
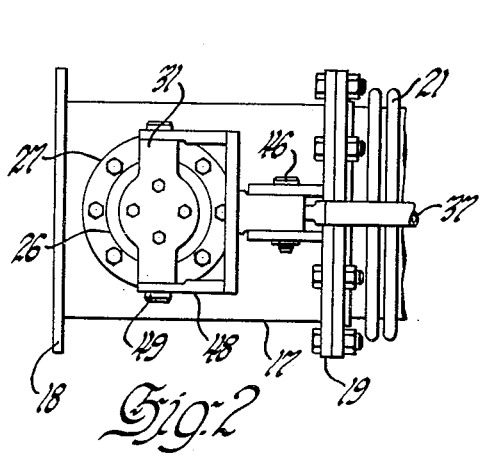
Figure 2 is a fragmentary elevational view of one end of the flexible pipe.
Figure 3:
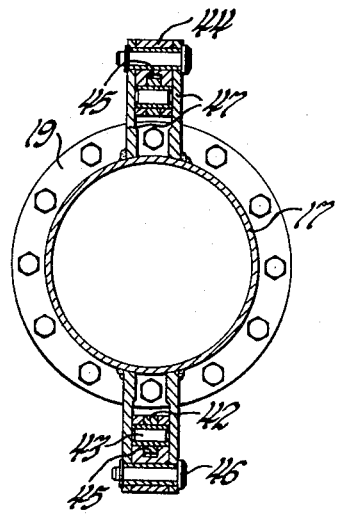
Figure 3 is a transverse sectional view taken on the plane indicated by the line 3—3 in Figure 4.

Referring first to Figure 1, the flexible pipe assembly P of the invention is illustrated as connecting two free piston gasifiers G to a turbine T. The gasifiers and turbine may be mounted by suitable supports on a frame or base, (not shown) which may, for example, be that of a locomotive or other vehicle. Expansions of the gasifiers and turbine due to changes in temperature between cold and operating conditions and racking of the frame or the like on which these are mounted may cause changes in the spacing between them and variations in their relative alignment. Motive fluid is transmitted to the turbine through the flexible pipe assembly P, which is rigidly connected to both and is constructed to accommodate these displacements as well as the thermal expansion of the pipe between cold and operating conditions.

More specifically, each gasifier G may have an exhaust pipe 10, these being connected to a rigid end pipe section 11 which has a Y end with inlets 12 into which the motive fluid flows from the gasifiers. The end pipe section 11 includes flanges 13 by which it is rigidly bolted to the gasifier exhaust pipes 10. The inlets 12 communicate with the common pipe section 14 which terminates in a flange 16.

The other end pipe section 17 comprises a flange 18 which may be bolted to a mating flange on the turbine inlet and a bolting flange 19 at the other end thereof. The flanges 16 and 19, respectively, are bolted to end flanges of flexible extensible pipe joints or pipe sections 21 and 22, which preferably are in the form of metal bellows as illustrated. The pipe joints include flanges at the inner ends thereof which are bolted to flanges 23 at the end of the rigid intermediate pipe section 24. As will be understood, the bellows joints 21 and 22 are capable of both angular and axial distortion as required. These are of equal effective area.

The pressure of the motive fluid in the pipe assembly P is compensated by two expansible chamber motors 26 mounted diametrically opposite to each other on the end section 17. Each of these motors comprises a flange 27 bolted over an opening in the wall of pipe 17, a bellows 28, a head 29 closing the outer end of the bellows, and a bracket 31 bolted to the head 29. The pressure in the pipe which tends to force the end sections 11 and 17 apart also urges the heads 29 outwardly. These heads are connected through linkage to the end section 11, the force advantage of the linkage being equal to the ratio of the area of each of the bellows 21 and 22 to that of the combined effective area of the expansible chamber motor bellows 28.

Clevis fittings 33 welded to the exterior of pipe section 11 are connected by pins 34 to fittings 35 on the ends of pull rods 36. Each pull rod is in two sections 37, the adjacent ends of which are threaded and are connected by a turnbuckle 38 which provides for adjustment of the length of the pull rod 36. The turnbuckle is locked by jam nuts 39.

The other end of the pull rod comprises an eye 42 connected by a pin 43 to a bellcrank lever 44. This bellcrank lever is fulcrumed on a pin 46 mounted in brackets 47 welded to the end section 17. A slot 45 in the ballcrank 44 defines a clevis which receives the eye fitting 42. The lever 44 includes a U-shaped yoke 48, each arm of which is coupled to the motor head bracket 31 by pins 49. As will be apparent, the lever 44 has two arms defined by the lines joining the center of pin 46 with the centers of pins 43 and 49. This lever preferably has a considerable force advantage of the order of three or four to one so that motors 26 of relatively small area may balance the operating force on the end sections. For example, if the ratio is three to one with two bellows 28, the effective area of each bellows need be only one-sixth the effective area of bellows 21.

The two bellows 28 shown are merely illustrative, as more could be employed if desired, but the additional complication would not be justified in most cases. The bellows should be symmetrically disposed so that the resultant of the forces exerted on the pull rods 36 coincides with the center of the pipe.

The intermediate pipe section 24 is stabilized and located to prevent its vibrating as a result of shock due to motion of the vehicle by a slidable connection between this pipe section and the pull rods. This is provided by ears 52 through which the rods 37 slidably extend and which are fixed to the flanges 23 by bolts 54 of those which fix the intermediate pipe section to the flexible joints. The openings 56 in ears 52 should provide sufficient clearance for rods 36 to permit some distortion of the parts.

It may be noted that pins 43, 46, and 49 may be mounted in bushings and may be retained by cotter keys or the like.

It will be apparent from the foregoing that the structure described is particularly well suited to obtain the advantages heretofore recited.

The invention is not to be considered as limited by the detailed description of the preferred embodiment presented to illustrate the principles thereof.

We claim:

1. A pressure-compensated flexible pipe comprising, in combination, two rigid end pipe sections, a rigid intermediate pipe section, two flexible expansible pipe joints connected to the ends of the intermediate pipe section and each connected to one of the end pipe sections, at least two symmetrically disposed pull rods interconnecting the end pipe sections, guide means on the intermediate pipe section adjacent each end thereof reciprocably mounting the pull rods on the intermediate pipe section; expansible-chamber motors each mounted on one of the end pipe sections, one said motor being coupled to each of the pull rods, the motors having chambers communicating with the interior of the pipe and walls movable radially of the pipe in response to pressure in the chambers; a fulcrum on the end section adjacent each motor, a bellcrank lever mounted on the fulcrum having one arm connected to the movable wall of the adjacent motor and having a second arm movable axially of the pipe in response to radial movement of the wall, one end of each pull rod being connected to a said second arm and the other end of the pull rod being fixed to the opposite end pipe section; the intermediate pipe section being located transversely of the axis thereof by the pull rods and the said guide means.

2. A pressure-compensated flexible pipe comprising, in combination, two rigid end pipe sections, a rigid intermediate pipe section, two flexible expansible pipe joints connected to the ends of the intermediate pipe section and each connected to one of the end pipe sections, two pull rods disposed at opposite sides of the axis of the pipe interconnecting the end pipe sections, guide means on the intermediate pipe section adjacent each end thereof reciprocably mounting the pull rods on the intermediate pipe section; two expansible-chamber motors each mounted on one of the end pipe sections, one said motor being coupled to each of the pull rods, the motors having chambers communicating with the interior of the pipe and walls movable radially of the pipe in response to pressure in the chamber; a fulcrum on the end section adjacent each motor, a bellcrank lever mounted on the fulcrum having one arm connected to the movable wall of the adjacent motor and having a second arm movable axially of the pipe in response to radial movement of the wall, one end of each pull rod being connected to a said second arm and the other end of the pull rod being fixed to the opposite end pipe section; the intermediate pipe section being located transversely of the axis thereof by the pull rods and the said guide means.

References Cited in the file of this patent

UNITED STATES PATENTS

| Number | Name | Date |
|---|---|---|
| 853,964 | Doolittle | May 21, 1907 |
| 993,934 | Witzenmann | May 30, 1911 |
| 1,636,687 | Farmer | July 26, 1927 |
| 2,099,413 | White | Nov. 16, 1937 |
| 2,196,676 | Johnson | Apr. 9, 1940 |
| 2,314,776 | Dittus | Mar. 23, 1943 |
| 2,335,478 | Bergman | Nov. 30, 1943 |
| 2,348,833 | Miller | May 16, 1944 |
| 2,545,701 | McCausland | Mar. 20, 1951 |

UNITED STATES PATENT OFFICE

CERTIFICATION OF CORRECTION

Patent No. 2,960,354 November 15, 1960

Albert N. Addie et al.

It is hereby certified that error appears in the above numbered patent requiring correction and that the said Letters Patent should read as corrected below.

Column 2, line 48, for "ballcrank" read -- bellcrank --; column 4, line 15, for "chamber" read -- chambers --.

Signed and sealed this 25th day of April 1961.

(SEAL)
Attest:

ERNEST W. SWIDER
Attesting Officer

DAVID L. LADD
Commissioner of Patents